United States Patent [19]

Willing

[11] Patent Number: 4,954,062

[45] Date of Patent: Sep. 4, 1990

[54] APPARATUS FOR CASTING

[75] Inventor: Jere J. Willing, Grays Lake, Ill.

[73] Assignee: Nu-Jer Electronics & Mfg. Inc., Grays Lake, Ill.

[21] Appl. No.: 395,902

[22] Filed: Aug. 18, 1989

[51] Int. Cl.[5] .............................................. B29C 39/04

[52] U.S. Cl. ...................................... 425/135; 425/84; 425/435

[58] Field of Search ................. 425/434, 84, 435, 453, 425/135; 264/86, 302

[56] References Cited

U.S. PATENT DOCUMENTS

| | | | |
|---|---|---|---|
| 795,613 | 7/1905 | Holtkott et al. | 425/447 |
| 1,196,824 | 9/1916 | Toomey | 249/102 |
| 2,202,797 | 5/1940 | Hoge et al. | 264/297.8 |
| 2,500,371 | 3/1950 | Merritt | 425/453 |
| 3,032,851 | 5/1962 | Gibbs | 425/439 |
| 3,189,971 | 6/1965 | Derror | 425/453 |
| 3,190,494 | 6/1965 | Derror | 222/1 |
| 3,495,742 | 2/1970 | Adamik | 222/304 |
| 3,537,156 | 11/1970 | Glass | 425/148 |
| 3,555,615 | 1/1971 | Orme | 425/435 |
| 3,626,998 | 12/1974 | Trusselle | 141/198 |
| 3,691,266 | 8/1977 | Greenberg | 264/86 |
| 3,724,979 | 4/1973 | Maringer et al. | 425/453 |
| 3,728,064 | 4/1973 | Conway | 425/377 |
| 3,801,255 | 4/1974 | Meyer et al. | 425/435 |
| 3,822,794 | 7/1974 | Fougea | 414/222 |
| 3,824,061 | 7/1974 | Giehler | 425/435 |
| 3,865,533 | 2/1975 | Deprez et al. | 425/86 |
| 3,880,562 | 4/1975 | Hujik | 425/151 |
| 4,043,737 | 8/1977 | Greenberg | 425/434 |
| 4,102,367 | 7/1978 | Shulman et al. | 141/231 |
| 4,331,626 | 5/1982 | Colby | 264/DIG. 60 |

*Primary Examiner*—Willard Hoag

*Attorney, Agent, or Firm*—Lockwood, Alex, FitzGibbon & Cummings

[57] ABSTRACT

An automated casting apparatus for use in slip casting is described. A rotatable table assembly is provided for retention of a plurality of plaster molds therein. The table assembly is provided with a clamp member to secure the molds in their relative positions within the table assembly to prevent slippage during rotation. The clamp is controlled by a rotational motor and will apply a predetermined amount of pressure on each of the molds by use of a load detector which will shut down the motor once the predetermined pressure has been attained. Once the molds are securely positioned within the table assembly, the assembly is rotated 90° to its "fill" position where the automatic filler can sequentially fill each of the molds with liquid slurry or slip to a predetermined level whereupon the filled molds are allowed to sit in position for a predetermined setup time which establishes the wall thickness of the castings. The table assembly is then rotated 180°; pouring the excess slip from the molds. The molds are allowed to sit in an inverted position for a predetermined amount of time to drain off the excess water and slurry from the inside cavity of each of the molds. Once the drip time has lapsed, the table assembly automatically is repositioned to its initial or load/unload position so that the molds and the castings therein may be removed. The system is preferably designed to allow for complete automation once the setup time and the drip times have been determined and the molds have been positioned within the table assembly.

20 Claims, 5 Drawing Sheets

FIG. 1
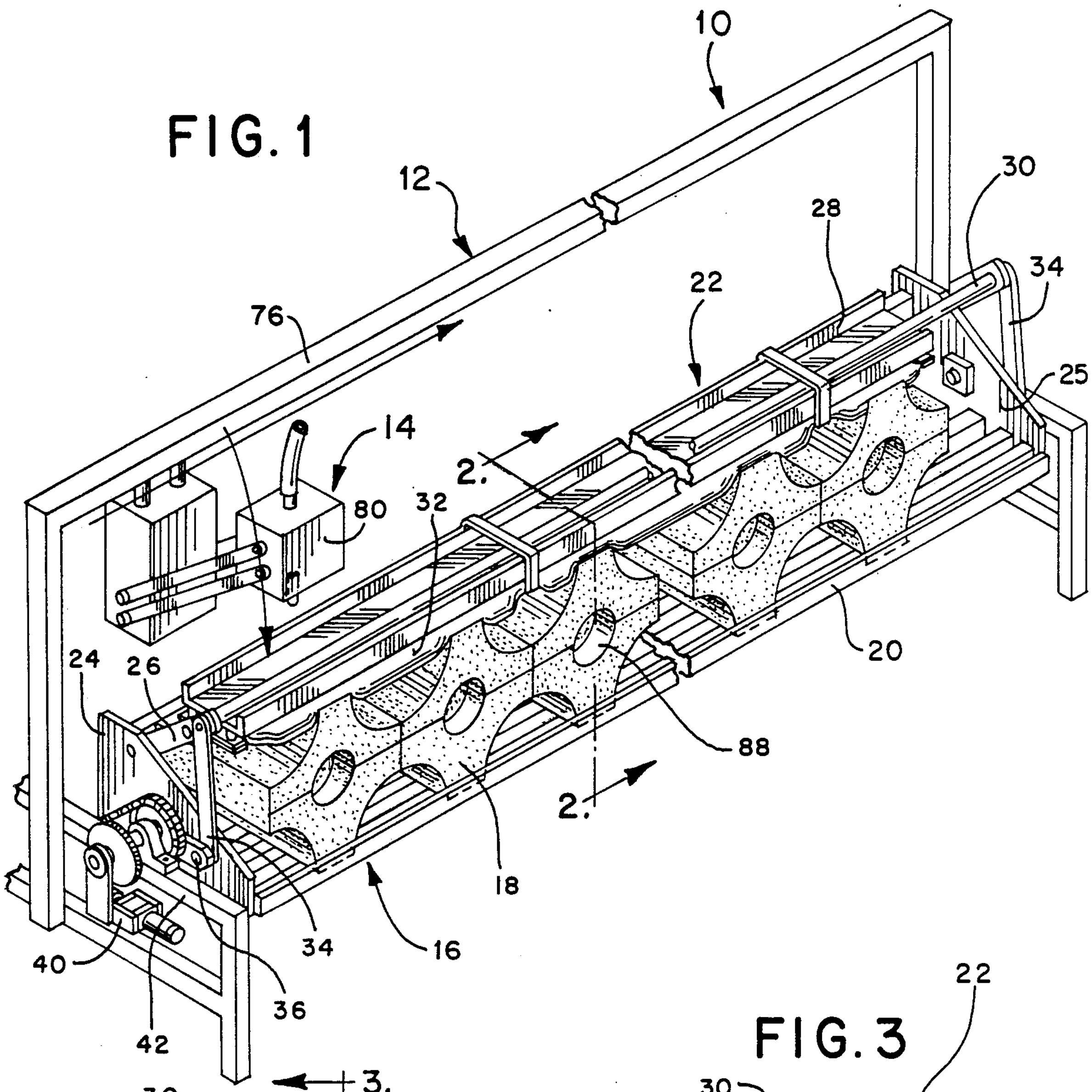
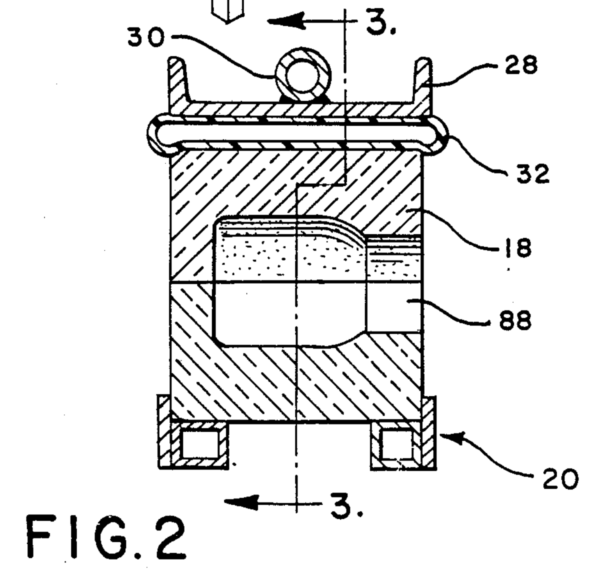
FIG. 2
FIG. 3
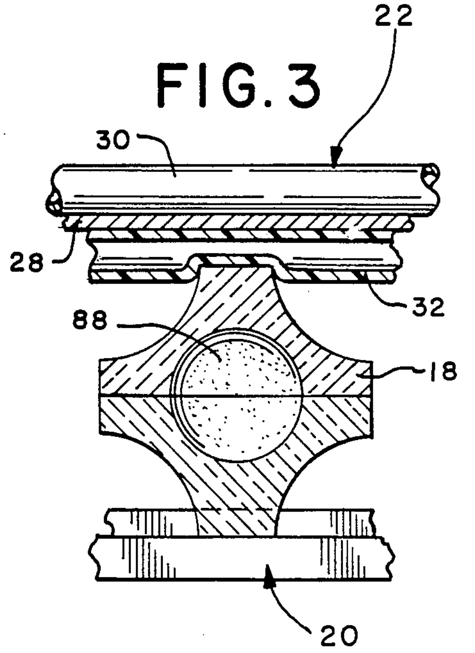

APPARATUS FOR CASTING

BACKGROUND AND BRIEF SUMMARY OF THE INVENTION

This invention relates to an apparatus for casting ceramic holloware. More specifically, the present invention relates to an automated rotatable carriage for retaining a plurality of ceramic holloware molds between upper and lower members and including means for equalizing clamping pressure over the surface of the molds to secure the molds within the carriage while the molds are rotated through a variety of positions. An automatic filling system is provided to automatically and sequentially fill each of a plurality of molds with ceramic slip material.

In the molding of ceramic holloware, those skilled in the art have generally utilized a carriage having a pair of frame members to clamp a plurality of plaster molds therebetween. The clamped molds are generally rotated to successive positions about a horizontal axis during different stages of the casting process. Such an apparatus for casting ceramic holloware may further include an inflatable member or balloon positioned along the inner face of one of the frame members to secure the molds in place within the carriage during rotation. When provided, the inflatable member or balloon equalizes clamping pressure over the surface of each mold by providing maximum surface area contact between the molds and the frame member associated with the balloon.

Where provided in the prior art, the inflatable member has generally been inflated only after the upper frame member has been locked in position to clamp the molds within the carriage. After casting, the balloon is deflated and the upper frame member is again opened. This constant inflation and deflation of the inflatable member is an unnecessary step in the casting process. Although the use of an inflatable member is generally useful for securing a plurality of molds in a clamped position, the prior art has failed to provide a casting device wherein the carriage is completely automated and wherein the upper frame member is equipped with a constant pressure air-filled bag.

The present invention provides an automated apparatus for casting wherein a plurality of molds are placed on a table or a lower member of a carriage. The molds are clamped within the carriage by an automated upper member which is lowered into a clamping position so that the upper and lower members are substantially parallel to each other with the molds secured therebetween. A constant pressure air bag or balloon is affixed along the underside of the upper member and extends longitudinally therealong. When the upper member is in the clamping position, the air bag is sandwiched between the molds and the underside of the upper member. In this manner, the molds are secured in their relative positions within the carriage by the balloon which serves to equalize the clamping pressure over the surfaces of all of the molds. Sensing means are provided so that the upper frame member will automatically adjust to a predetermined clamp pressure.

After the molds have been secured the carriage is automatically rotated to position the molds for sequential filling by an automatic filler which fills each mold cavity with ceramic slip material. An automatic filler suitable for use herein is described in U.S. Pat. No. 4,102,267, the disclosure of which is incorporated by reference herein.

The filled molds are allowed to set for a predetermined period of time in order for the slip to form a soft casting. Following the predetermined set time, the carriage automatically rotates further to pour the excess slip from the molds while the molds are held in a inverted position for a predetermined "drip time". Following the drainage of the molds, the carriage is returned to the initial horizontal position for unloading. Once the carriage has been returned to its initial position, the clamp automatically opens so that the castings may then be removed from the molds.

Automation is accomplished by a pair of motors and related controls. A clamp motor drives the upper clamp member between an opened and a closed position. A load detector, associated with the clamp motor, shuts the motor off upon sensing that a predetermined clamp pressure has been attained. A carriage positioning motor and related gearing rotationally drives the carriage to position the molds in the orientations necessary for casting. A programmable carriage control operates the carriage positioning motor once the molds have been securely clamped within the carriage to position the carriage and the molds in the "fill" position wherein a fill control operates the filler to sequentially fill each of the molds secured within the assembly. After completion of the filling sequence, the fill control returns the auto filler to its initial position and the ceramic slip within the molds is allowed to set for a preset time after which the carriage control again rotates the carriage and molds to spill out excess slip and the molds are maintained by the carriage control in an inverted position for a preset "drip" time. The carriage control then re-positions the carriage and molds to the load/unload position to then enable the clamp motor to open the clamp so that the molds can be opened and the soft clay castings removed from within.

Accordingly, it is an object of the present invention to provide an automated apparatus for casting ceramic holloware having a rotatable table assembly or carriage mounted on a frame, the table assembly including upper and lower clamp members for retaining a plurality of molds therebetween with automated control means for positioning the upper clamp member between an opened position and a closed position, and automated rotation means for rotating the carriage when the upper clamp member is in the closed position.

It is another object of the present invention to provide the above-described automated apparatus for casting ceramic holloware and further including an air bag or cushion positioned along the upper clamp member to contact the plurality of molds when the upper clamp member is in the closed position.

It is still another object of the present invention to provide the above-described automated apparatus for casting ceramic holloware and further including an automated filler for filling each of the plurality of molds.

BRIEF DESCRIPTION OF THE DRAWINGS

These and other objects and advantages of the present invention will be more fully appreciated by those skilled in the art upon consideration of the remainder of the disclosure including the detailed description of the preferred embodiment in conjunction with the various drawings, of which:

FIG. 1 is a perspective view of a single casting apparatus constructed in accordance with the present invention;

FIG. 2 is an elevated cross-sectional view of the apparatus of FIG. 1 taken along 2—2 line thereof;

FIG. 3 is an elevated cross-sectional view of a portion of the apparatus of FIG. 2 taken along the 3—3 line thereof;

DETAILED DESCRIPTION OF THE PREFERRED EMBODIMENT

Figure 4:
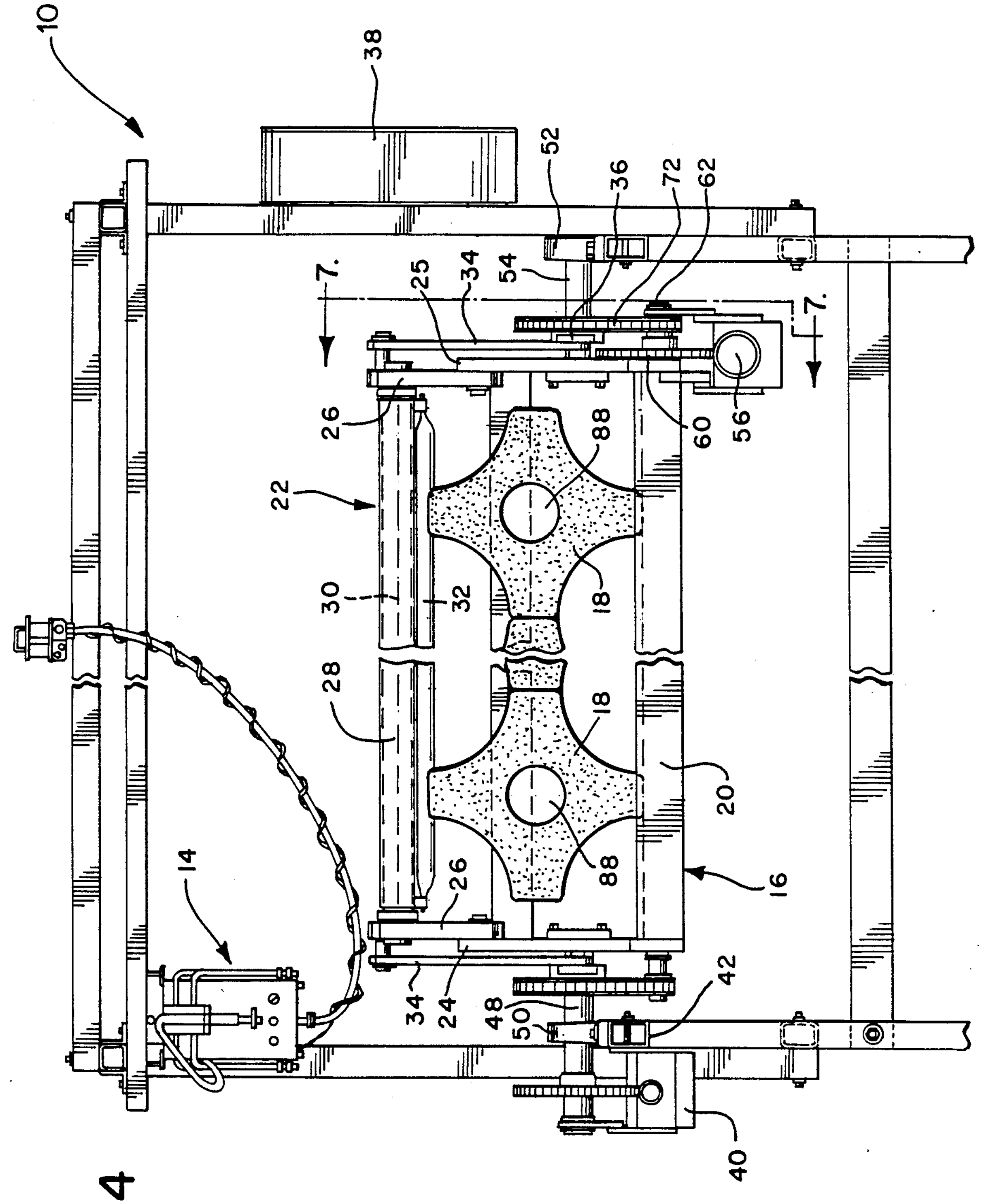
FIG. 4 is a front elevational view, partly broken away, of a casting apparatus constructed in accordance with the present invention.
Figure 5:
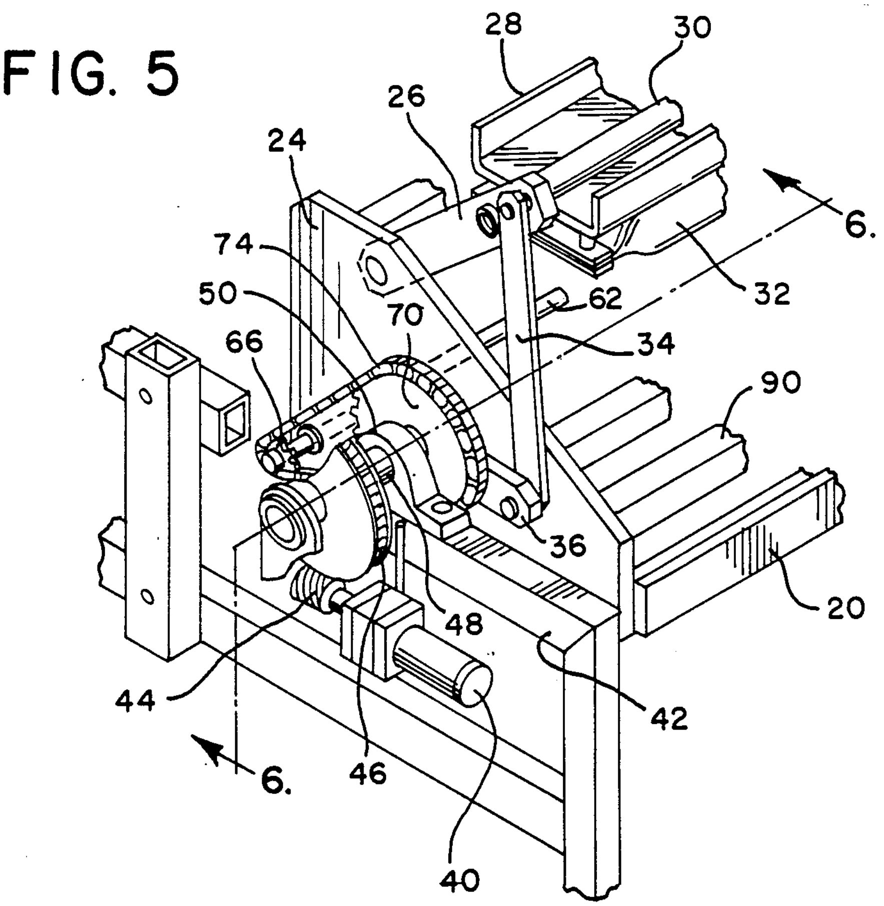
FIG. 5 is a perspective view of a casting apparatus showing a portion of the left side thereof and constructed in accordance with the present invention.
Figure 6:
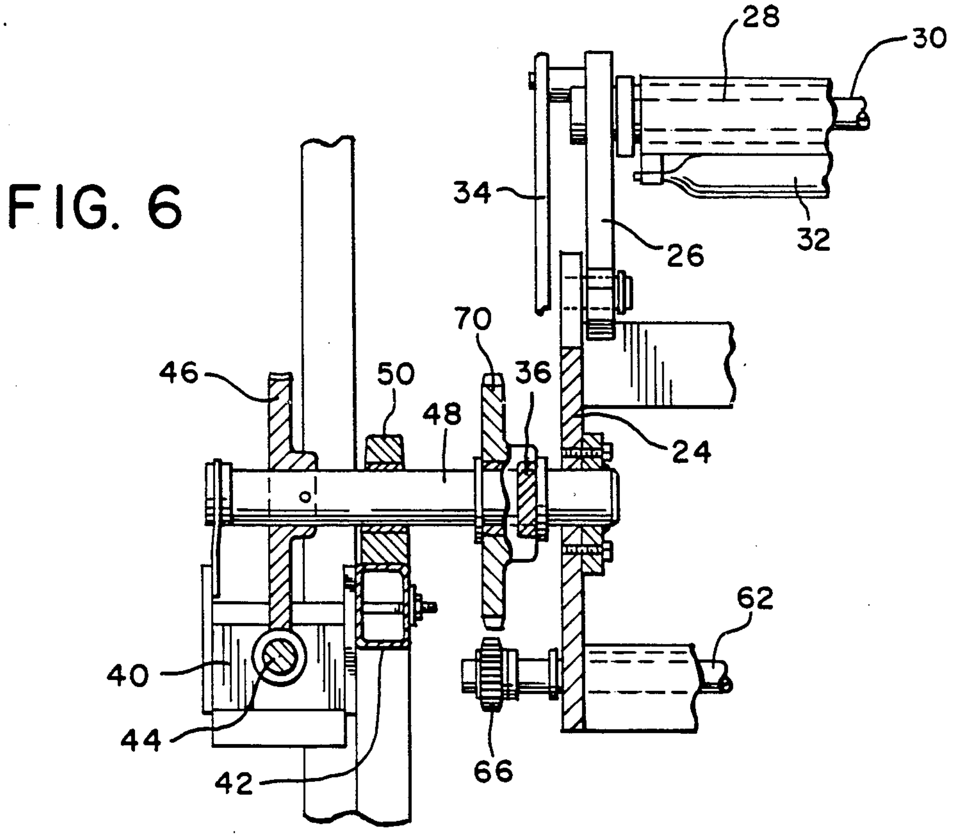
FIG. 6 is a sectional view of the casting apparatus of FIG. 5 taken along the 6—6 line thereof.

An apparatus constructed in accordance with the present invention, as discussed and described herein, provides an automated assembly for casting ceramic holloware into vases, lamp bases and the like In its preferred embodiment, the apparatus includes a rotatable table assembly capable of retaining a plurality of molds between a lower member or table and an upper member The table assembly is provided with automated rotation means to position the clamped molds in the various orientations necessary for effectively casting ceramic holloware The casting apparatus is provided with an automated filler capable of sequentially filling each of the molds with a casting slurry. An automatic filler suitable for this purpose is described in U.S. Pat. No. 4,102,367, for example The casting apparatus of the present invention is automated in all of its substantial aspects and also includes a contact-pressure air-filled vinyl tube or balloon affixed along the length of the upper clamp member to equalize the clamping pressure exerted on each of the molds retained within the rotatable table assembly.

Referring generally to the various Figures, a casting apparatus 10 constructed in accordance with the principles of the present invention is shown The apparatus 10 generally includes a frame 12 to support various elements of the invention such as the automatic filler 14, a rotatable table assembly 16 and related means for controlling the rotation of the table assembly 16 as well as the means for clamping a plurality of molds 18 within the table assembly 16.

The rotatable table assembly 16 generally includes a lower member or table 20 and an upper member or clamp 22. The table 20 is affixed to vertically extending end plates 24, 25 which, in turn, are axially mounted on the frame 12 in a manner to be further described herein. The table 20 is dimensioned to support a plurality of conventional plaster molds 18 for casting ceramic holloware.

A clamp or upper member 22 is pivotally affixed at both ends thereof to the identical end plates 24 and 25 by support bars 26 to allow the clamp 22 to be positioned between an opened position and a closed position. In the closed position, the clamp 22 will provide sufficient clamping pressure to retain the molds 18 within the rotatable table assembly 16 so that the table assembly can be rotated while securely retaining the molds 18 therein. The clamp 22, in its preferred form, includes a "C" plate 28 affixed to a longitudinally extending support rod 30. The rod 30, in turn, is affixed to and extends between the support bars 26 so that the "C" plate 28 is suspended above the molds 18 and the table 20.

A cushion or balloon 32 is preferably affixed to the bottom surface of the "C" plate 28. The balloon 32 is preferably provided as a constant pressure vinyl tube which is partially inflated with air or another suitable gas or liquid. Most preferably, the tube is very lightly inflated with air to a pressure of approximately 2 to approximately 4 psi. The balloon 32 is sealed and provides a means for equalizing the clamping pressure applied to the plurality of molds 18 by the clamp 22. More specifically, as the upper clamp 22 applies pressure to the molds 18 the balloon 32 contacts the top of each mold 18 and spreads out to partially envelop the top surface of each mold. In this manner, the balloon 32 contacts a maximum surface area of the molds when the upper clamp member 22 is in a closed position to thereby provide an added measure of stability so that the molds do not slip out of position when the table assembly 16 is rotated.

A pair of identical connection arms 34 ar provided for connecting each of the support bars 26 to a drive bar 36. Each drive bar 36 is connected to a motor driven gearing mechanism, further described below, which drives the two drive bars 36 in either a clockwise or counterclockwise rotation. In the preferred arrangement of parts, the drive bar 36 is rotated in a clockwise manner to position the clamp member 22 in a closed position by exerting sufficient downward force along the length of the connection arms 34 to pull the upper clamp member 22 down so that the balloon 32 is secured against the top portions of the molds 18. The partially pressurized balloon 32 effectively envelop the surface area of the top surface of each mold 18 when the clamp member 22 is lowered into the closed position. As will be appreciated by those skilled in the art, use of the partially pressurized balloon 32 allows clamping pressure to be equalized along the uppermost surface area of each of the molds 18 to more securely retain the molds within the table assembly 16 to thereby prevent any slippage of the molds during the rotation of the table assembly.

The casting apparatus 10 of the present invention is automated in all of its substantial aspects. More specifically, the clamp 22 may be positioned between its opened position and its closed position by a single drive means which is preferably equipped with means for detecting when adequate clamping pressure has been achieved. Rotation of the table assembly 16 is also accomplished by a dedicated and automated drive which may be pre-programmed to provide a sufficient amount of time for each of the molds to be filled with liquid slurry or slip and for a subsequent setup time prior to dumping excess slurry from the molds 18. The filler 14 automatically fills each of the molds 18 in sequence. The above-mentioned rotation drive, clamping drive and automatic filler are normally controlled through a set of controls contained within a common panel 38 which is preferably mounted to one of the sides of the frame 12, substantially as shown in FIG. 4.

Regarding the rotational drive means, a carriage positioning motor 40 is mounted to the frame 12 and preferably to the horizontal table support bar 42 at one end of the table assembly 16. The carriage motor 40 drives a straightworm 44 which, in turn, drives worm gear 46. The worm gear 46 is mounted on the end of the rotational shaft 48 to translate the rotational motion of the worm gear 46 to the shaft 48. A bearing 50, mounted on the table support bar 42, receives rotational shaft 48 therethrough. The rotational shaft 48 is affixed to a first end plate 24 on the side of bearing 50 opposite the worm gear 46. In this arrangement, the motor 40 drives straightworm 44 which, in turn, drives the worm gear 46 to thereby rotate the table assembly 16 along the axis of the rotational shaft 48.

As will be appreciated by those skilled in the art, only one motor 40 is required to rotate the table assembly 16. Consequently on the side of the table assembly 16 opposite the motor 40, a second bearing 52 and a second rotational shaft 54 are provided with the second shaft 54 oriented along the same axis as the rotational shaft 48. The second shaft is mounted at one end to a second end plate 25 with the opposite end of the shaft 54 positioned for rotation within the second bearing 52. In the described configuration of parts, the table assembly 16 rotates along the axis defined by and extending between the two rotational shafts 48 and 54, as illustrated in FIG. 4.

Figure 7:
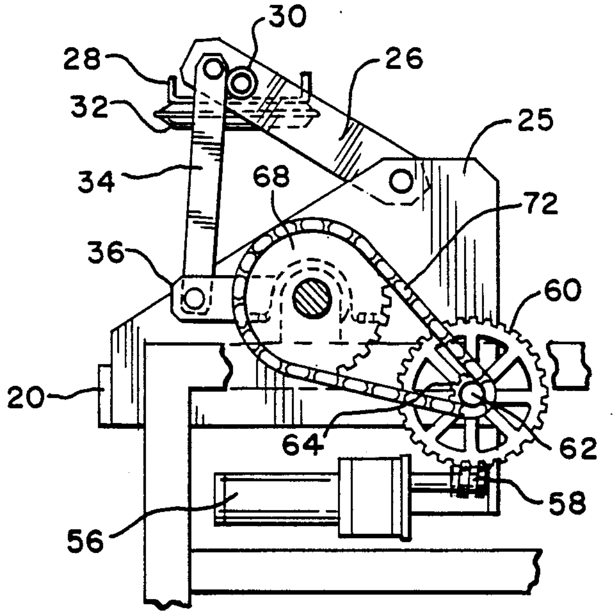
FIG. 7 is a sectional view, partly broken away, of the casting apparatus of FIG. 4, taken along the 7—7 line thereof.

A clamp drive means is provided for positioning the upper member or clamp 22 between an opened positioned and a closed position. In the preferred embodiment, the clamp drive means includes a second clamp motor 56 which provides rotational drive to an associated straightworm 58 which, in turn, imparts rotational motion to worm gear 60. The worm gear 60 is preferably mounted on an end of a drive shaft 62 and a second, smaller diameter sprocket 64 is also mounted along the drive shaft 62 next to worm gear 60 and preferably outwardly thereof, substantively as shown in FIG. 7. An identical small diameter sprocket 66 is similarly mounted to the opposite end of the drive shaft 62. Each of the small diameter sprockets 64 and 66 are drivingly engaged to larger diameter clamp-drive sprockets 68 and 70 by chains 72 and 74, respectively. The clamp drive sprockets 68 and 70 are mounted along the shafts 48 and 54 and are preferably secured thereto by a shaft mounted bearing for rotation independent of the two shafts 48 and 54. In this arrangement of parts, the rotational drive provided by the worm 58 and worm gear 60 are transferred to drive shaft 62 and, in turn, to the smaller diameter sprockets 64 and 66. The chain drives 72 and 74 drive the clamp drive sprockets 68 and 70 to position the upper member or clamp 22 in an opened position or in a closed position by displacement of the radially extending clamping arm or drive bar 36 affixed to each of the clamp drive sprockets 68 and 70.

Regarding the relationship between the drive bar 36 and the clamp 22, the drive bar 36 is pivotally connected to the connection arm 34 which, in turn, is connected to the support bar 26. Downward rotational displacement of drive bar 36 will lower the upper member or clamp 22 so that the balloon 32 rests upon the uppermost surfaces of the molds 18. The clamping motor 56 must be powerful enough and provide enough torque so that the clamp 22 and the balloon 34 are pressed firmly against the molds 18 to secure the molds 18 within the table assembly 16 in a tight clamp-like manner so that rotation of the table assembly does not allow the individual molds to slip out of their relative positions within the table assembly 16. In securing the upper member 22 against the molds 18, rotation of the drive shaft 62 translates rotational motion to both of the smaller diameter sprockets 64 and 66 and, in turn, to each of the clamp drive sprockets 68 and 70. Consequently, equal driving force is applied to both sides of the upper member 22 so that the clamping pressure applied to the molds 18 is substantially uniform along the entire length of the upper member 22.

To open the clamp 22, the drive of clamp motor 56 may be reversed to raise the drive bar 36 and, through the interrelationship of parts described herein consequently raise the upper member 22. When driven to its closed position by clamp motor 56, the clamp 22 will close on the molds 18 until a predetermined clamping pressure has been achieved. Detection of this required clamping load is generally accomplished by monitoring the current drawn by clamp drive motor 56, and shutting off the motor when a preselected current corresponding to the predetermined clamping pressure is detected.

An automatic filler or "autofiller" 14 is provided to sequentially fill each mold 18 with a liquid slurry or slip which, after standing, will form a soft clayware within each mold. Briefly, the autofiller 14 is suspended from and moves along a track 76 which is parallel with the line of molds 18 held within table assembly 10. The autofiller 14 includes at least one arm 78 which swings between two positions, a raised position above the molds 18 and a filling position wherein the nozzle 80 is lowered over the appropriate mold for placement of slurry or slip therein. The nozzle 80 is intended to enter the mouth 88 of each of the molds 18 and generally includes a probe (not shown) which dips down into the mold. Circuitry is provided within the carriage of the autofiller 14 to cooperate with the probe of the nozzle 80 and with various sensing elements on the track and carriage. The preferred autofilling system can generally be programmed to move to the end of the line after filling the molds 18 and then stop or return all the way to the beginning of the line. Alternatively, the autofiller 14 may effect the same filling operation in reverse such as, for example, to top off containers in case of evaporation during the first filling sequence.

Figure 12:
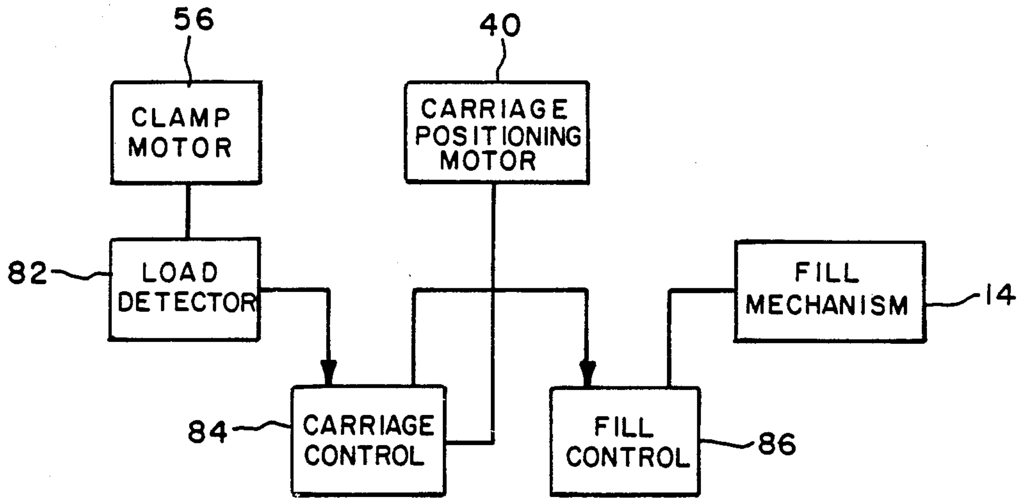
FIG. 12 is a schematic representation of the relationship between the various elements for automating the casting apparatus of the present invention.

Referring to FIG. 12, a functional block diagram illustrating the preferred system for automating the casting apparatus 10 is shown and will now be described. In general, the electronics required to accomplish the various automation functions described herein are commercially available and known to those skilled in the art. As mentioned, the clamp motor 56 is provided with a load detector 82 which monitors the current drawn by the motor 56 and interrupts current to the motor when a predetermined clamping pressure has been attained. Once the clamp motor has been stopped carriage control 84 becomes operative and the table assemble 16 may be rotated to predetermined positions by the carriage positioning motor 40.

The carriage control 84 may be pre-programmed in a known manner to position the table assembly in the various positions necessary for properly casting ceramic materials. For example, the molds 18, once they have been properly clamped within the table assembly 16, generally must be placed in an upright position by rotating the molds 18 90° so that the opening 88 of each of the molds are properly positioned for receiving the nozzle 80 of autofiller 14. Accordingly, carriage control 84 must be capable of controlling the carriage positioning motor 40 to rotate the table assembly 16 into the required positions such as the 90° rotation required for filling each of the molds 18.

The fill control 86 is associated with the carriage control 84 so that the autofiller 14 becomes operative when the table assembly 16, under the control of carriage control 84 is positioned in the upright or "fill" position. In this manner, the fill control 86 will position the autofiller 14 for filling the molds 18 only when carriage control 84 has properly positioned the table assembly 16 so that the mold openings 88 are in a position to receive the nozzle 80 of the autofiller 14. Under the control of carriage control 84, the carriage positioning motor 40 is capable of rotating the table assembly 16 a full 360° and will rotate the assembly 16 through degrees of arc to thereby position the assembly 16 and the molds 18 in various positions needed for casting—i.e. filling, dumping and dripping of excess slurry, and back again to the load/unload position. The specific electronics required for achieving each of the control functions described herein are generally available and are known to those skilled in the art. These electronics may be conveniently packaged within a control panel 38 and mounted on the frame 12 on either side of the casting apparatus 10.

Figure 8:
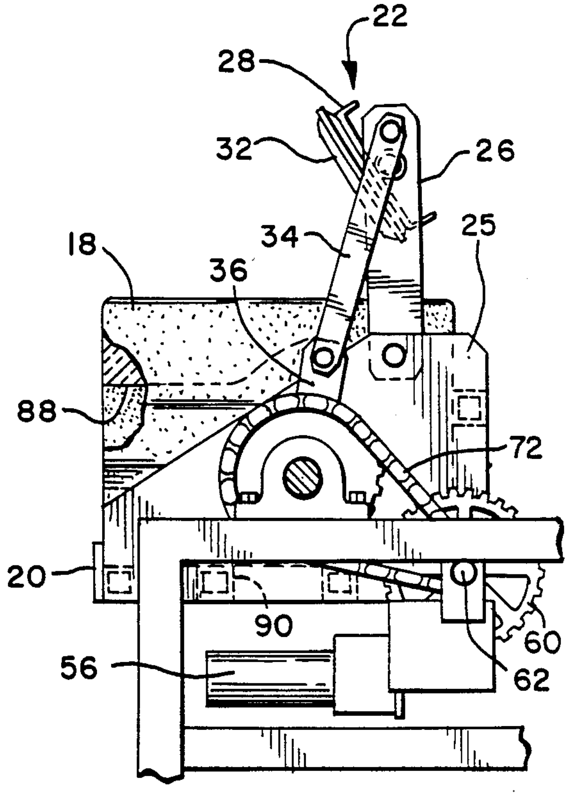
FIG. 8 is a side elevational view of the casting apparatus of FIG. 7 and showing the upper clamp member in an opened position.
Figure 9:
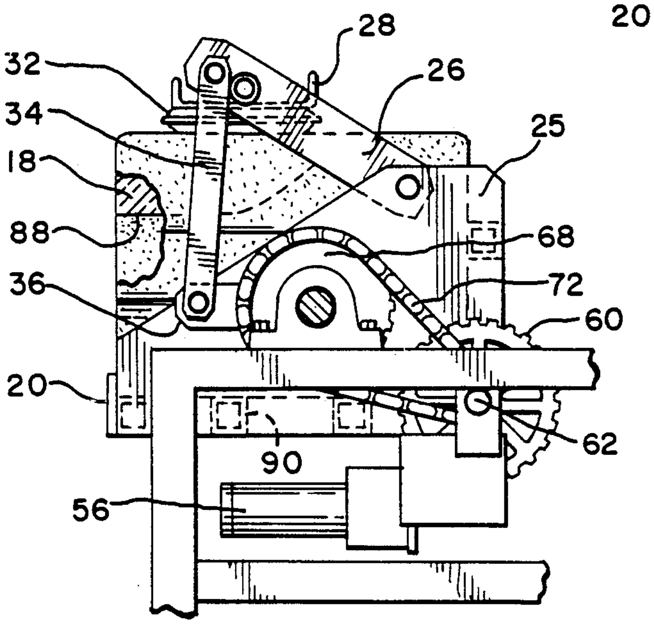
FIG. 9 is an elevated side view of the c sting apparatus of FIG. 8 showing the upper clamp member in a closed position.
Figure 10:
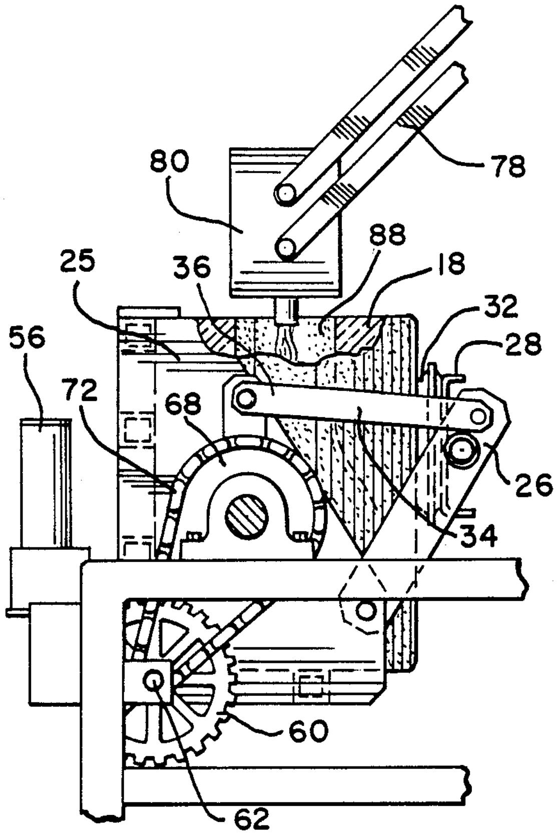
FIG. 10 is a side elevational view of the casting apparatus of FIG. 9 and showing a mold held within the table assembly and positioned for filling.
Figure 11:
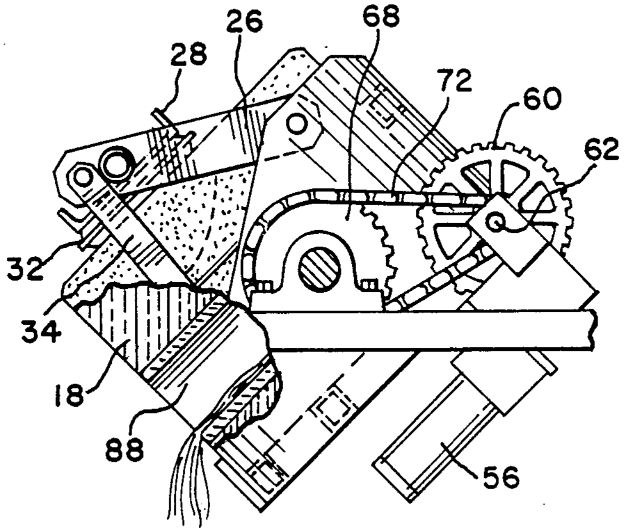
FIG. 11 is a side elevational view of the casting apparatus of FIG. 10 and showing a mold held within the table assembly and positioned for dumping.

In operation, the table assembly 16, is initially positioned in a load/unload position wherein the table 20 provides a horizontal surface upon which the molds 18 can be placed, substantially as shown in FIG. 8. In the load/unload position the molds 18 are placed within the carriage to rest upon the cross braces 90 of the table while the upper member 22 is in the opened position. Once the desired number of molds have been placed to rest upon the table 20, the setup and drip time cycles programmed, the clamp motor 56 may then be activated to position the upper member 22 in a closed position, substantially as shown in FIG. 9. Upon reaching a predetermined load, load detector 82 will shut down the clamp motor 56 which signals carriage control 84. Under control of the carriage control 84, the carriage positioning motor 40 positions the table assembly 16 and the molds 18 into position for filling by the autofiller 18. Generally, this will require that table assembly 16 be rotated 90° to orient the mold cavities from a substantially horizontal orientation to a vertical or upright orientation, as shown in FIG. 10. With molds 18 in a "fill" position, the fill control 86 is activated, thereby initiating the fill sequence for the autofiller 14.

In its fill mode, the autofiller 14 moves along a track 76 suspended above the molds 18. The filler 14 moves to the first mold 18, stops, and lowers its nozzle 80 by movement of the autofiller arms 78 under control of fill control 86. Liquid slurry is poured from the nozzle 80 to fill the mold to a predetermined level. Upon sensing an adequate level for the slurry, nozzle 80 is deactivated and retracted by the autofiller arms 78. The autofiller 14 then moves to the next mold and repeats the same fill cycle until all of the molds 18 within the table assembly 16 are filled.

At the end of the fill sequence, control of the carriage is returned to the carriage control 84 which allows the table assembly 16 to remain in its "fill" position for a predetermined period of time to allow the slip to adequately set. Typically, a setup time between 20 and 55 minutes is required. Once the predetermined setup time has lapsed, the carriage control proceeds to further rotate the table assembly 16 to a "spill" position 270° from its initial load/unload position. Rotation of the assembly 16 to the "spill" position is preferably slow enough to allow excess slurry to be dumped into a trough (not shown) positioned beneath the table assembly with a minimum amount of splashing. In this manner, the excess slurry will be poured from each of the molds 18 while the table assembly is being rotated to completely invert the molds 18. In the inverted position, the molds are allowed to sit for a predetermined time to allow any remaining slurry to drip from the inner cavity of each mold 18. Generally, a drip time between 3 minutes and 30 minutes is satisfactory. The table assembly 16 and the molds 18 are then rotated back to the original load/unload position under the control of carriage control 84. The clamp 22 automatically opens and an operator may lift off the top half of each of the molds 18 to remove the soft clayware from the lower half thereof.

In the preferred form of the invention, the setup time and the drip time are selected by the operator prior to initiation of the automated sequence. As known by those skilled in the art, the setup time and the drip time will vary with the volume of the mold used. However, once these two time periods have been selected, the operator merely needs to initiate the operating sequence and, from that point on, the operation of the casting apparatus 10 will preferably be completely automatic.

At least two automated operating cycles are contemplated for casting with the casting apparatus of the present invention. For example, a front load cycle wherein the molds are initially positioned within the table assembly 22 to face the front of the machine, substantially as shown in FIG. 1, has been described and is the most typical mode of operation. A backload mode is also contemplated wherein the molds 18 are initially positioned within the table assembly 16 so that the mold openings 88 are positioned 180° away from the front of the casting apparatus 10, substantially the opposite of that which is depicted in FIG. 1.

Regarding materials, the tube or balloon 32 is preferably made of a heavy vinyl or similar material which will retain 2 to 4 psi of air or other gas, when sealed, for substantially an indefinite period of time. The various individual parts of the machine generally should be made of steel or other suitably durable and strong metallic material. Both the clamping motor 56 and the table drive motor 40 are commercially available and should be capable of withstanding heavy loads for heavyduty use.

Regarding various dimensions, the preferred embodiment of the casting apparatus 10 is not intended to be limited in its dimensional aspects. However, a casting apparatus which is approximately 11 feet 6 inches long and 6 feet high can easily be constructed and should fit within the spacial constraints of most manufacturing facilities. A casting apparatus having such dimensions can easily accommodate 7 to 15 plaster molds, depending on their exact sizes.

While a preferred embodiment has been disclosed and described in detail herein, it will be appreciated by those skilled in the art that various changes and modifications may be made to the described embodiment It will be recognized that such changes and modifications may be made to the preferred embodiment without departing from the true spirit and scope of the present invention as defined in the following claims.

What is claimed is:

1. A mechanized apparatus for casting ceramic holloware, comprising:

a frame;

at least one rotatable table assembly mounted on said frame and dimensioned to releasably retain a plurality of molds therein, said table assembly including a table and a clamp member mounted between a pair of end plates, said end plates pivotally connected to said frame through first and second shafts associated therewith, said clamp member being positionable between a closed position and an opened position relative to said table;

automated control means for positioning said clamp member between said opened position and said closed position, said control means including a load detector for detecting a predetermined clamping pressure applied to said molds by said clamp member, said clamp member and said table retaining said plurality of molds therebetween; and automated rotation means for rotating said table assembly when said clamp member is in said closed position.

2. The mechanized apparatus of claim 1, said apparatus further comprising:

automated filler means mounted on said frame for filling each of said plurality of molds in a predetermined manner; and filler control means for controlling said automated filler means.

3. The apparatus of claim 1, wherein said automated rotation means includes a rotational motor mounted to said frame, said rotational motor driving a worm and worm gear combination, said worm gear being mounted on said first shaft such that rotation of said worm gear rotates said table assembly about an axis defined by said first shaft and said second shaft.

4. The mechanized apparatus of claim 1, wherein said clamp member further includes a cushion, said cushion being positioned on said clamp member to contact said molds when said clamp member is in said closed position.

5. The mechanized apparatus of claim 4, wherein said cushion is partially filled with air to provide a uniform distribution of clamping pressure on said plurality of molds when said clamp member is in said closed position.

6. The apparatus of claim 1, wherein said automated control means includes a clamp motor and a worm and worm gear combination, said worm connected to and driven by said clamp motor, said worm drivingly engaged with said worm gear and said worm and worm gear combination being operatively associated with said clamp member to position said clamp member between said opened position and said closed position under the control of said clamp motor.

7. The apparatus of claim 6, further comprising:

a drive shaft extending through said end plates and mounted for rotation therein, said worm gear of said control means being mounted on said drive shaft near one end thereof such that rotation of said worm gear causes said drive shaft to rotate therewith;

a pair of drive sprockets each drive sprocket having a diameter less than the diameter of said worm gear, each said drive sprocket mounted for rotation at opposite ends of said drive shaft; and a pair of clamp sprockets drivingly engaged to opposite ends of said clamp member, each said clamp sprocket connected to one of said drive sprockets such that rotation of said drive sprockets also rotates said clamp sprockets to thereby position said clamp member between said open position and said closed position.

8. A mechanized apparatus for casting ceramic holloware, comprising:

a frame;

at least one rotatable table assembly mounted on said frame and dimensioned to releasably retain a plurality of molds therein, said table assembly including a table and a clamp member mounted between a pair of end plates, said end plates pivotally connected to said frame through first and second shafts associated therewith, said clamp member being positionable between a closed position and an opened position relative to said table;

automated control means for positioning said upper clamp member between an opened position and a closed position, said control means including a load detector for detecting a predetermined clamping pressure applied to said molds by said clamp member, said clamp member and said table retaining said molds therebetween;

automated rotation means for rotating said table assembly when said clamp member is in said closed position;

automated filler means mounted on said frame for filling each of said plurality of molds in a predetermined manner; and filler control means for controlling said automated filler means.

9. The mechanized apparatus of claim 8, wherein said rotation means include a rotational motor mounted to said frame, said rotational motor driving a worm and worm gear combination, said worm gear being mounted on said first shaft such that rotation of said worm gear rotates said table assembly about an axis defined by said first shaft and said second shaft.

10. The mechanized apparatus of claim 8, wherein said clamp member further includes a cushion, said cushion being positioned on said clamp member such that said cushion contacts said molds when said clamp member is in said closed position.

11. The mechanized apparatus of claim 10, wherein said cushion is partially filled with air to provide for a uniform distribution of clamping pressure on said plurality of molds when said clamp member is in said closed position.

12. The apparatus of claim 8, wherein said automated control means includes a clamp motor and a worm and worm gear combination, said worm connected to and driven by said clamp motor, said worm drivingly engaged with said worm gear and said worm and worm gear combination being operatively associated with said clamp member to position said clamp member between said opened position and said closed position under the control of said clamp motor.

13. The apparatus of claim 12, further comprising:

a drive shaft extending through said end plates and mounted for rotation therein, said worm gear of said control means being mounted on said drive shaft near one end thereof such that rotation of said worm gear causes said drive shaft to rotate therewith;

a pair of drive sprockets, each drive sprocket having a diameter less than the diameter of said worm gear, each said drive sprocket mounted for rotation at opposite ends of said drive shaft; and a pair of clamp sprockets drivingly engaged to opposite ends of said clamp member, each said clamp sprocket connected to one of said drive sprockets such that rotation of said drive sprockets also rotates said clamp sprockets to thereby position said clamp member between said opened position and said closed position.

14. A mechanized apparatus for casting ceramic holloware, comprising:

a frame;

at least one rotatable table assembly mounted on said frame and dimensioned to releasably retain a plurality of molds therein, said table assembly including a table and a clamp member mounted between a pair of end plates, said end plates pivotally connected to said frame through first and second shafts associated therewith, said clamp member being positionable between a closed position and an opened position relative to said table;

automated filler means mounted on said frame for filling each of said plurality of molds in a predetermined manner; and filler control means for controlling said automated filler means.

15. The mechanized apparatus of claim 14, said apparatus further comprising:

automated control means for positioning said clamp member between said opened position and said closed position, said control means including a load detector for detecting a predetermined clamping pressure applied to said molds by said clamp member, said clamp member and said table retaining said molds therebetween; and automated rotation means for rotating said table assembly when said clamp member is in said closed position.

16. The mechanized apparatus of claim 15, wherein said rotation means includes a rotational motor mounted to said frame, said rotational motor driving a worm and worm gear combination, said worm gear being mounted on said first shaft such that rotation of said worm gear rotates said table assembly about an axis defined by said first shaft and said second shaft.

17. The mechanized apparatus of claim 15, wherein said clamp member further includes a cushion, said cushion being positioned on said clamp member such that said cushion contacts said molds when said clamp member is in said closed position.

18. The mechanized apparatus of claim 17, wherein said cushion is partially filled with air such that said cushion provides a uniform distribution of clamping pressure when said clamp member is in said closed position.

19. The apparatus of claim 15, wherein said automated control means includes a clamp motor and a worm and worm gear combination, said worm connected to and driven by said clamp motor, said worm drivingly engaged with said worm gear and said worm and worm gear combination being operatively associated with said clamp member to position said clamp member between said opened position and said closed position under the control of said clamp motor.

20. The apparatus of claim 19, further comprising:

a drive shaft extending through said end plates and mounted for rotation therein, said worm gear of said control means being mounted on said drive shaft near one end of said drive shaft such that rotation of such worm gear causes said drive shaft to rotate therewith;

a pair of drive sprockets, each drive sprocket having a diameter less than the diameter of said worm gear, each said drive sprocket mounted for rotation at opposite ends of said drive shaft; and a pair of clamp sprockets drivingly engaged to opposite ends of said clamp member, each said clamp sprocket connected to one of said drive sprockets such that rotation of said drive sprockets also rotates said clamp sprockets to thereby position said clamp member between said opened position and said closed position.

* * * * *